Sept. 16, 1941.  C. C. FARMER ET AL  2,256,279
RETAINING VALVE DEVICE
Filed Dec. 19, 1939   2 Sheets-Sheet 2
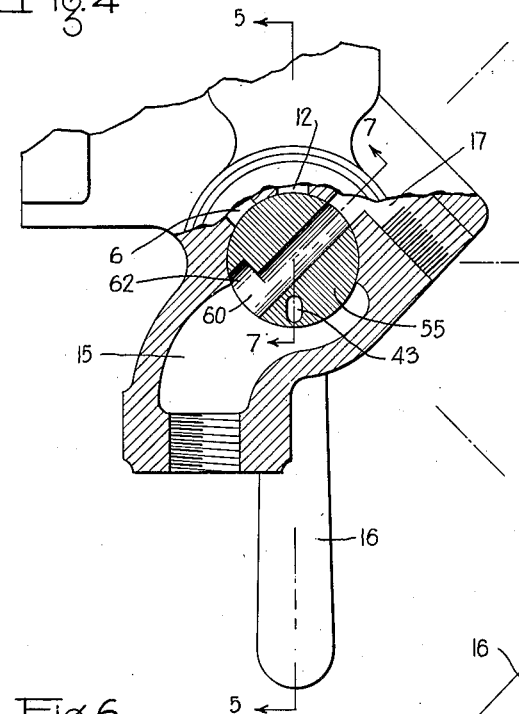
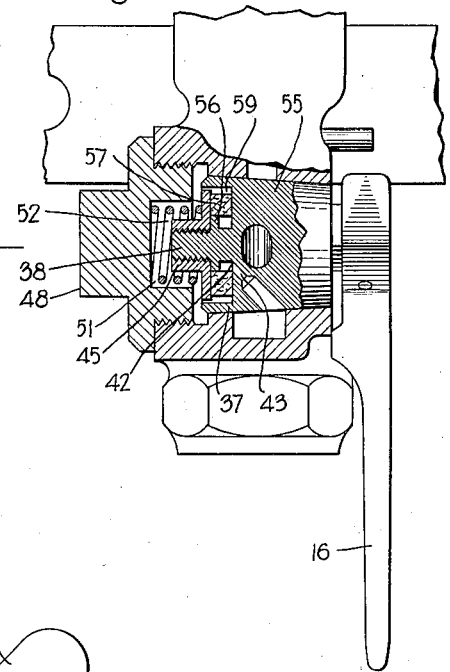
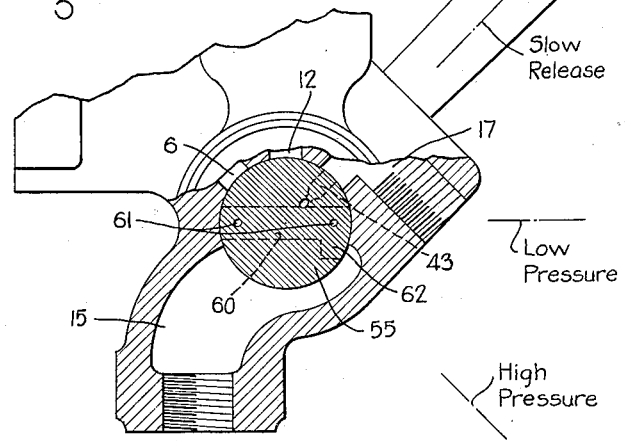
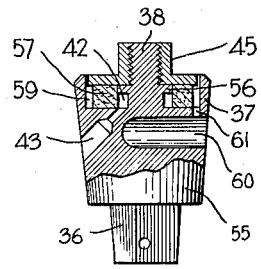
INVENTORS
CLYDE C. FARMER
ELLIS E. HEWITT
BY
ATTORNEY Patented Sept. 16, 1941

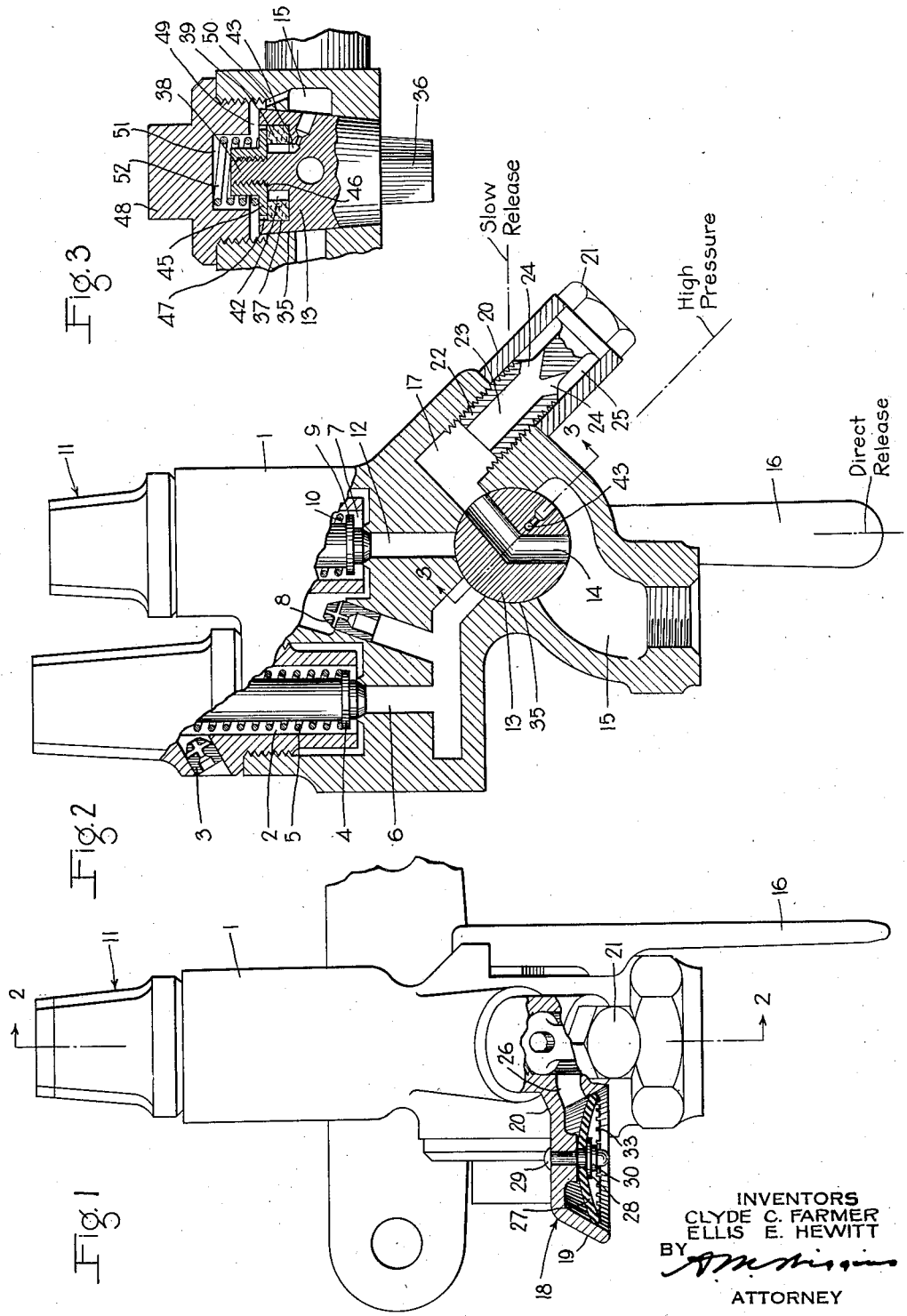

2,256,279

UNITED STATES PATENT OFFICE 2,256,279

RETAINING VALVE DEVICE

Clyde C. Farmer, Pittsburgh, and Ellis E. Hewitt, Edgewood, Pa., assignors to The Westinghouse Air Brake Company, Wilmerding, Pa., a corporation of Pennsylvania Application December 19, 1939, Serial No. 309,998

6 Claims. (Cl. 183—39)

This invention relates to retaining valve devices of the type adapted to be employed in fluid pressure brake systems for retaining fluid pressure in the brake cylinders, during "cycling" operations on a grade, to maintain the brakes applied while the brake system is being recharged with fluid under pressure.

In order to insure safe control of trains operating on grades, where one or more applications of the brakes may be required, manually adjustable retaining valve devices of various types have long been employed on railway cars. These retaining valve devices are adapted, when "cycling" the brakes, to limit the amount of air released from the brake cylinders and thereby maintain the brakes applied with limited force, or to provide for the continuous complete release of fluid under pressure from the brake cylinder at a predetermined slow rate, while the brake pipe and associated apparatus of the air brake system are being recharged in preparation for a subsequent application of the brakes.

Retaining valve devices of the usual type now in extensive use each comprise a pair of spring weighted valves and a rotary plug or keyed valve operable, according to the positioning of a handle, to divert the flow of air discharged from the brake cylinder past one or more of the valves to the atmosphere, or through the usual always open direct exhaust port.

This latter port is usually provided at its outer end with a protector for preventing the entrance of nest building insects and for preventing clogging of the passage by dirt or ice. In the more recent designs of retaining valve devices the body thereof is so constructed as to accommodate the port protector, but there are a great many retaining valve devices in service which do not embody such a device, and it is an object of the present invention to provide an exhaust port protector which may be applied to an old retaining valve device without having to remove the device from a car.

In some instances it has been found to be desirable to employ a continuous slow release of fluid under pressure from the brake cylinder to maintain the brakes applied while the brake system is being recharged and to insure a complete release of brakes at the bottom of a grade without requiring manual manipulation of the retaining valve operating handle.

This feature has been originally incorporated in some specially designed retaining valve devices, but the majority of retaining valve devices do not employ the feature. It is another object of the invention to provide a plug valve adapted for use in these latter devices which is provided with means for effecting the continuous slow complete release of fluid from the brake cylinder and which is readily substituted for the old plug valve. By this substitution and, in some instances, the drilling of a small port through an interior wall of the body, the retaining valve device is conditioned for either the continuous complete slow release of brake cylinder pressures or the limiting of the amount of reduction in brake cylinder pressure.

According to this feature of the invention the plug valve is provided with the slow release port and since this port must necessarily be of very small diameter it is liable to be clogged with rust and dirt which may be carried thereto by exhaust air from the brake cylinder. It is accordingly another object of the invention to provide straining means incorporated in the plug valve for removing the foreign matter from the air stream before it reaches the port, thereby protecting the port against clogging.

Another object of the invention is to provide a plug valve for a retaining valve device which will embody in a unitary structure a port for providing a continuous slow complete release of fluid under pressure from the brake cylinder and a fluid straining or cleaning medium for freeing air from foreign matter before the air reaches the port.

In the accompanying drawings:

Fig. 1 is an elevational view partly in section, of a three position retaining valve device embodying one form of the invention with an improved vent protector attached thereto.

Fig. 2 is a vertical sectional view taken along the line 2—2 of Fig. 1.

Fig. 3 is a sectional view taken along the line 3—3 of Fig. 2.

Fig. 4 is a partial vertical sectional view similar to Fig. 2 of a pressure retaining valve device illustrating a modified form of the invention, showing the plug valve of the device in direct release position.

Fig. 5 is a vertical sectional view taken along the line 5—5 of Fig. 4.

Fig. 6 is a sectional view similar to Fig. 4 showing the device turned to an added or slow continuous complete release position.

Fig. 7 is a sectional view of the plug valve in Fig. 6 embodying the straining means and plug valve secured together in a unitary structure.

Referring to the drawings and particularly to Figs. 1, 2 and 3 thereof, the retaining valve device indicated generally by the character 11 is illustrated as a three position retaining valve device similar to the usual type, such for example as shown, described and claimed in Patent No. 1,685,843 of C. C. Farmer, issued October 2, 1928.

As shown in the drawings, the retaining valve device comprises a casing or body portion 1 having the usual exhaust valve chamber 2 connected to the atmosphere through a choke plug 3 and containing the usual low pressure retaining valve 4 and valve spring 5 for controlling communication from a passage 6 to chamber 2.

The casing or body portion is also provided with the usual chamber 7 connected through choke plug 8 with passage 6 and containing the usual high pressure retaining valve 9 and spring 10 for controlling communication between a passage 12 and the chamber 7.

Also contained in the casing 1 is a plug or rotary type valve 13 having a port or waterway 14 which, when the valve is in its normal position, as shown or in high pressure operating position, is adapted to open into a chamber 15, which chamber is connected through the usual retaining valve pipe to the exhaust passage of the triple valve device (not shown). The plug valve is adapted to be positioned in the several operating positions as hereinafter described through the medium of an operating handle 16. With the plug valve disposed in direct release position, as shown in Figs. 1, 2 and 3, the waterway 14 is adapted to connect the inlet chamber 15 with the usual interiorly screw-threaded exhaust passage 17, with which an exhaust fitting 18 is associated as will now be described.

The exhaust fitting 18 comprises a hollow inverted cup or funnel shaped bracket 19 which is carried by a sleeve portion 20 adapted to be secured to the casing in registration with the exhaust port 17 of the retaining valve device by means of a cap screw 21, which has a screw-threaded portion 22 adapted to be screwed into the screw-threaded portion of the exhaust passage 17. The cap screw 21 is provided with an axial bore 23 which is open at its outer end to a plurality of cross passages 24 leading to the interior space 25 of the sleeve portion 20, which space is open to a vent passage 26 leading to the hollow portion of the bracket 19.

A flexible circular diaphragm or disk 27, preferably formed of resilient material such as rubber, is disposed in the cup-shaped bracket 19 and is secured to this member in any suitable manner and, for the purpose of illustration, is in the present embodiment shown secured to the bracket 19 by means of an annular washer 28 carried by a rivet 29 which is secured to the bracket 19. This washer is locked in place by a snap ring 30 fitted to the rivet adjacent the lower head thereof. By the use of such a snap ring and washer the flexible diaphragm or disk 27 is rendered readily removable and replaceable. A circumferential edge of the diaphragm is adapted to engage the inner surface of the cup or funnel shaped bracket 19 for preventing access to the discharge passage by particles of foreign matter or by nest building insects such as the mud wasp. A plurality of notches 33 are formed in the outer edge of the diaphragm for providing always open exhaust communication to the atmosphere and to prevent a sealing engagement thereof with the inner surface of the cup or funnel shaped discharge opening. These notches are relatively small and therefore provide openings which are unattractive to insects, such as mud wasps.

It will be understood that when fluid under pressure is vented from the exhaust port 17 to the atmosphere through the port protector fitting 18 the rubber diaphragm or disk 27 will deflect downwardly and provide a large direct opening to the atmosphere.

It will be noted that the downwardly depending wall of the bracket 19 extends below the peripheral edge of the diaphragm so as to prevent rain, snow and the like from collecting on and around the diaphragm or disk, which in case of freezing might prevent deflection of the diaphragm.

The rotary plug valve 13 is of the usual cone shape and fits in a correspondingly shaped aperture or valve seat 35 in the body. The small end of the rotary plug valve is provided with a square shaped extension 36 to which the operating handle 16 is secured. The large end of the plug valve is provided with a central annular bore 37 which encircles a central screw-threaded extension 38 carried by the plug valve.

Contained in the bore 37 is a cylindrical shaped straining element 39 which, in the present embodiment of the invention, may be made of felt or any other such material pervious to air. The outer surface of the straining element 39 preferably abuts against the outer wall of the bore 37 and is thus held against lateral movement into the plane of a choked port 43. The inner surface of the strainer element and the outer surface of the extension define an annular chamber 42 which communicates with the choke port 43 leading to the face of the plug valve 13. The strainer is held in place by a cap 45 which is screwed on the threaded end of the extension 38, excessive inward movement of the cap being arrested by a shoulder 46 of the extension before the cap can effect excessive compression of the strainer element 39.

The outer diameter of the strainer element 39 has a snug fit with the wall of bore 37. The flange of the cap 45 which contacts the strainer element defines with the wall of bore 37 an annular port 47 through which fluid may flow to the strainer element.

A cap nut 48 threaded into the valve body closes the large open end of the plug valve cavity and together with the valve and casing define a chamber 49 which is open by way of annular port 47 to chamber 42 and which is connected by way of a small passage 50 to the inlet chamber 15. The cap nut 48 is provided with a counter-bore 51 for the reception of a spring 52 which exerts a pressure against the cap 45 in order to insure a tight fit between the plug valve 13 and its seat.

In operation, with the plug valve 13 in the normal or direct release position, as shown in the drawings, and the brakes being released, fluid under pressure released from the brake cylinder flows through the chamber 15 and port or waterway 14 to the atmospheric exhaust passage 17, from whence it flows to the atmosphere by way of bore 23, cross passages 24, space 25, passage 26 and past the resilient disk 27.

In high pressure position of the retaining valve device the port or waterway in the plug valve 13 connects chamber 15 to passage 12. When the brakes are released with the plug valve in this position, fluid under pressure released from the brake cylinder flows through the chamber 15, port or waterway 14 to passage 12. The supply of fluid under pressure to passage 12 from the brake cylinder lifts the valve 9 against the pressure of spring 10 and fluid then flows into valve chamber 7, thence through choke plug 8 into passage 6. The fluid under pressure thus supplied to passage 6 then lifts the valve 4 against the opposing force of the spring 5 and flows into valve chamber 2 and thence through choke 3 to the atmosphere.

According to one feature of the invention, when the operating handle is turned to continuous slow complete release position, the port or waterway 14 is lapped by the seat and the choked port 43 is adapted to communicate with the exhaust passage 17 thereby establishing communication between inlet chamber 15 and the usual exhaust passage 17. This communication, beginning at passage 15, is made by way of passage 50, chamber 49, annular passage 47, through strainer element 39, chamber 42 and choke port 43 to passage 17, so that any rust and dirt carried by the exhaust air from the brake cylinder is removed by the strainer element 39 before reaching the choke port 43.

The retaining valve device shown in Figs. 4 to 7, inclusive, differs chiefly from the device shown in Figs. 1 to 3, inclusive, in that it embodies a different plug valve for making possible the use of the usual retaining valve device provided with three brake cylinder exhaust positions and an additional or fourth exhaust position for effecting the continuous slow complete release of fluid under pressure from the brake cylinder. In this form of the invention the passage 50 of the device shown in Fig. 3 is omitted and the plug valve, as will hereinafter appear, is provided with equivalent ducts or ports. Another difference resides in the provision of a stop for defining the fourth position of the actuating valve handle.

The plug or rotary valve 55 embodied in the modified form of the invention differs from the plug valve 13 shown in the first embodiment of the invention in that the central screw-threaded extension 38 which is carried by the valve and encircled by the chamber 37 is provided with a circular collar 56 which is located between the valve and the screw-threaded portion of the extension.

A strainer element 57, of the same type as described in connection with Figs. 1, 2 and 3, is fitted around the outer periphery of the collar 56 and is disposed in the chamber 37, thus forming the chamber 42 which communicates with the choked port 43 leading to the face of the plug valve 55, as shown in Figs. 5 and 7.

The outside diameter of the straining element 57 is smaller than that of the bore 37, so that when the strainer is maintained in a central position in the chamber by the collar 56, the outer surface of the strainer and the adjacent inner surface of the valve defines a chamber 59, which is open to a port or waterway 60 through one or more small ports 61, provided in the valve. At the face of the plug valve the port or waterway 60 is provided with a toe cavity 62.

In operation, this retaining valve device functions in direct release and high pressure positions in the usual manner to perform the same functions as hereinbefore described in connection with Figs. 2 and 3, and is operated in the usual manner in low pressure position to establish communication between inlet chamber 15 and passage 6, by way of port or waterway 60. When the brakes are released with the plug valve in this latter position fluid under pressure released from the brake cylinder flows through the chamber 15, port or waterway 60 to passage 6. The supply of fluid under pressure to passage 6 from the brake cylinder lifts the valve 4 against the opposing pressure of the spring 5 and fluid then flows into valve chamber 2 and thence through choke 3 to the atmosphere.

According to this modified form of the invention, when the operating handle is turned to the fourth or continuous slow complete release position, as shown in Fig. 6 of the drawings, the toe cavity 62 in the face of the valve provides communication from chamber 15 to port or waterway 60. When the brakes are released with the plug valve in this fourth position, fluid under pressure released from the brake cylinder flows through chamber 15, toe cavity 62, port or waterway 60, small ports 61, chamber 59, through straining element 57, chamber 42, and choked port 43 to exhaust passage 17. Any rust and dirt carried by the exhaust air from the brake cylinder is removed by the straining element 57 before reaching the choked port 43.

It will be understood that the port protector fitting 18, although not shown associated with this modified retaining valve device, may be, if it is so desired, attached thereto in the same manner as shown and described in connection with Figs. 1, 2 and 3.

From the foregoing description it will be seen that I have provided means for protecting exhaust ports of a retaining valve device against clogging by dirt and other foreign matter and have also provided simple means for readily incorporating in retaining valve devices now in service a continuous slow complete brake cylinder release feature.

While several illustrative embodiments of the invention have been described in detail, it is not our intention to limit its scope to these embodiments or otherwise than by the terms of the appended claims.

Having now described our invention, what we claim as new and desire to secure by Letters Patent, is:

1. A plug valve structure comprising a plug valve having at one end a central extension and a chamber formed in said valve which encircles said extension, said plug valve also having an inlet fluid conducting communication leading to said chamber and an outlet fluid conducting communication leading from the chamber, a fluid straining medium disposed in said chamber adapted to remove foreign matter from an air stream which may flow therethrough, and means adapted to be secured to said extension for securing said straining medium to the valve.

2. A filter structure for a retaining valve device of the type comprising a casing having an inlet passage and an outlet passage and a bore adapted to receive a cone-shaped plug valve for controlling communication between said inlet and outlet passages, said filter structure comprising a cone-shaped plug valve having at the large end thereof a central extension and an annular recess encircling said extension, said recess being arranged to communicate with said inlet and outlet passages, an annular straining element disposed in said recess and interposed in the path between said inlet and outlet passages for removing foreign matter from an air stream which may flow therethrough and a cap having screw-threaded engagement with said extension for securing said straining element to the valve.

3. A filter structure for a retaining valve device of the type comprising a casing having an inlet passage and an outlet passage and a bore adapted to receive a cone-shaped plug valve for controlling communication between said inlet and outlet passages, said filter structure comprising a cone-shaped plug valve having at the large end thereof a central extension and an annular recess encircling said extension, said plug valve also having a first fluid conducting communication arranged to connect said inlet passage to said recess and a second fluid conducting communication leading from said recess and arranged to be connected to said outlet passage, an annular straining element disposed in said recess and interposed between said first and second communications for removing foreign matter from an air stream which may flow therethrough, and a cap having screw-threaded connection with the extension for securing the straining element to said valve, said cap having an annular flange of less diameter than said straining element to form said first communication leading to said recess.

4. A filter structure for a retaining valve device of the type comprising a casing having an inlet passage and an outlet passage and a bore adapted to receive a cone-shaped plug valve for controlling communication between said inlet and outlet passages, said filter structure comprising a cone-shaped plug valve having at the large end thereof a central screw-threaded projection and a central annular bore adapted to encircle said central screw-threaded extension, a cylindrical shaped ring of pervious material the outer face of which snugly fits against the outer wall of the central annular bore, a chamber defined by the inner surface of said ring and the outer surface of the extension, a cap having screw-threaded connection with the extension for securing said ring in said annular bore, said cap being of smaller diameter than the bore and which with the wall of the bore defines an annular port, said annular port being arranged to connect with said inlet passage, a communication leading from said chamber and being arranged to connect with said outlet passage, said ring of pervious material being adapted to remove foreign matter from an air stream which may flow from said annular port to said communication.

5. A plug valve structure comprising a cone-shaped plug valve with a through port providing one communication therethrough; another communication therethrough comprising a first passage leading off from said through port, a central annular bore provided at the large end of the valve and a second passage leading from the bore to the face of the valve; an extension carried by the valve, said extension projecting into and extending beyond the outer end of the bore; a circular collar disposed in the bore and carried by the extension; an annular member of pervious material disposed in the bore and adapted to fit around the outer periphery of said collar for straining fluid which may flow through said other communication; and a second collar having screw-threaded connection with said extension for maintaining said member in a central position in said bore.

6. A filter structure for a valve device of the type having a fluid conducting inlet passage and a fluid conducting outlet passage, said filter structure comprising a plug valve provided at one end with a bore and also having a through port for controlling communication between said inlet and outlet passages, a fluid straining element adapted to remove foreign matter from an air stream which may flow from said inlet to said outlet passage, said straining element comprising an annular ring of pervious material the outer face of which is adapted to snugly fit against the outer wall of said bore, an extension carried by said valve, and a cap having screw-threaded connection with said extension for securing said straining member to said valve, said cap having a flange of less diameter than said straining element and which with the wall of the bore provides an annular port, said port being in constant open communication with said inlet passage.

CLYDE C. FARMER.
ELLIS E. HEWITT.